May 4, 1926.
C. T. PFLUEGER
1,583,764
FISHING REEL
Filed June 26, 1924
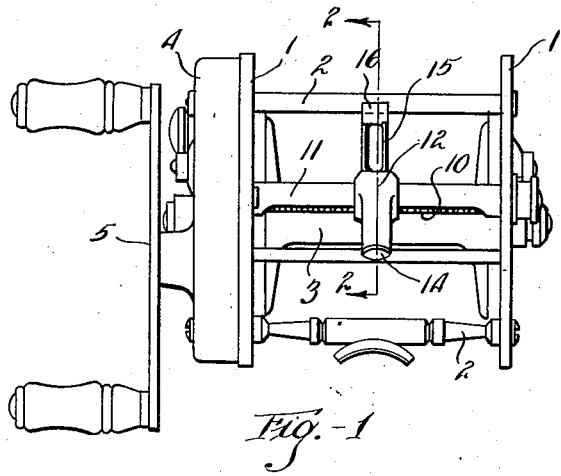
Fig.-1
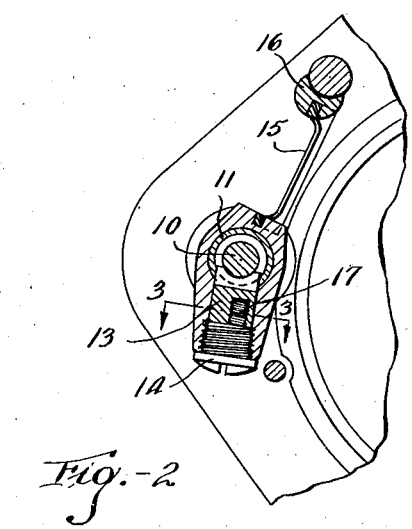
Fig.-2
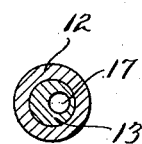
Fig.-3
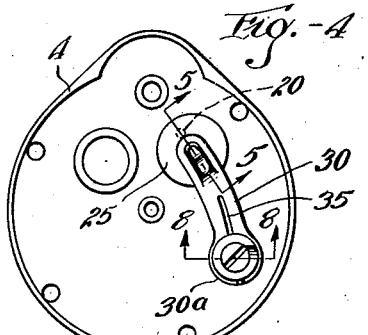
Fig.-4
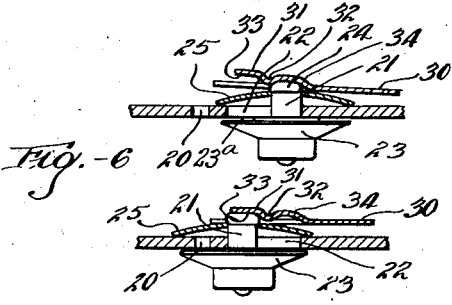
Fig.-6
Fig.-5
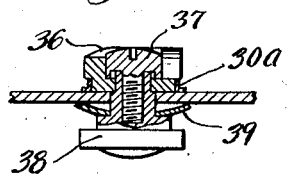
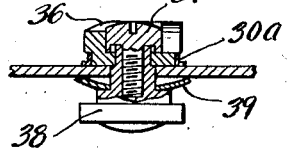
Fig.-8
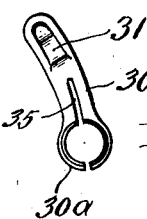
Fig.-7
Inventor
Charles T. Pflueger
By Brockett, Hyde & Milburn
Attorneys Patented May 4, 1926.

1,583,764

UNITED STATES PATENT OFFICE.

CHARLES T. PFLUEGER, OF AKRON, OHIO, ASSIGNOR TO THE ENTERPRISE MANUFACTURING COMPANY, OF AKRON, OHIO, A CORPORATION OF OHIO.

FISHING REEL.

Application filed June 26, 1924. Serial No. 722,497.

*To all whom it may concern:*

Be it known that I, CHARLES T. PFLUEGER, a citizen of the United States, residing at Akron, in the county of Summit and State of Ohio, have invented certain new and useful Improvements in Fishing Reels, of which the following is a specification.

The present invention relates to improvements in fishing reel structures.

The object of this invention is to provide a simple and yet efficient means for assembling the pawl or nut which is actuated by the threaded shaft for operation of the line guide.

For a more complete understanding of the general reel structure here illustrated, reference may be had to the copending application of Francis M. Case, filed of even date herewith, Serial No. 722,524.

In the drawing, Fig. 1 is a front elevation of a fishing reel embodying my invention; Fig. 2 is a detail sectional view thereof on the line 2—2, Fig. 1; Fig. 3 is a detail sectional view on the line 3—3, Fig. 2; Fig. 4 is an elevation of the inside of the gearing case; Fig. 5 is a detail sectional view on the line 5—5, Fig. 4; Fig. 6 is a view similar to Fig. 5 but with the oil opening exposed; Fig. 7 is a side elevation of the closure spring member; and Fig. 8 is a detail sectional view on the line 8—8, Fig. 4.

Referring to the drawing, the reel therein illustrated includes the usual end heads 1 connected by pillars 2 and between which end heads rotates a spool 3, upon which the fishing line is adapted to be wound. The spool is operated by suitable gearing in the gear casing 4 attached to one end head, the gears being actuated by the operating handle 5.

The level wind mechanism includes a reversely threaded shaft 10 rotatable by the gearing in casing 4 and enclosed within a slotted protecting tube 11, the tube and shaft being endwise removable through an opening in an end head. Sleeved and sliding upon the protecting tube 11 is a carriage 12 within which is a pawl 13 engaging the shaft threads through the slot in said protecting tube, said pawl being held within said carriage in engagement with said shaft by a threaded plug 14. To guide the line to the spool, the carriage 12 is provided with two upwardly extending substantially parallel plate members 15 joined at their upper ends by a block 16 having a recess to receive one of the pillars connecting the end heads along which pillar said block is adapted to slide.

To enable the pawl to be readily inserted into its position in the travelling carriage and rotated into proper engaging relation with the threads of the shaft 10 or to be removed from the carriage, said pawl is provided in its rear end with an opening 17 convenient for the reception of a small tool, such as a match, tooth-pick or the like, by means of which it may be easily and quickly inserted into position within the carriage and then turned to properly engage it with the shaft threads. In the arrangement shown the opening is eccentric to facilitate turning of the pawl. The wall of this opening may be threaded as shown and the match or other tool may be screwed into it.

The circular wall of the gear casing 4 is provided with a suitable aperture 20 through which lubricant may be introduced for lubricating the mechanism within the casing. In order to prevent the escape of lubricant and the entrance into the gear casing of dirt and other foreign matter, a suitable closure is provided for said aperture. Said closure comprises a shank 21 slidable in an elongated slot 22 in the casing wall adjacent the oil opening 20, said shank having a relatively large head 23 on the outside of the casing wall and being headed over on its inside, as at 24, for securement purposes. Arranged between the inner surface of the casing wall and the head 24 of the shank is a spring washer 25, the purpose of which is to hold the closure frictionally in any position to which it may be adjusted. In the position shown in Fig. 5, the flanged head 23 covers the oil opening 20, but by sliding the closure to the opposite end of the elongated slot 22, the oiling opening is exposed so that the mechanism within casing 4 may be readily lubricated.

In order to ensure the maintenance of said closure in proper position, either with the oil opening 20 covered or exposed, a suitable leaf spring 30 is provided. One end of said spring is suitably secured to the inner surface of the circular casing wall while the free end portion of said spring is adapted to yieldingly engage the headed end 24 of the closure shank, thus tending to move said shank outwardly and the spring washer 25 more firmly into engagement with the casing wall.

In the preferred embodiment a longitudinally disposed tongue 31 is struck up from the metal of the free end portion of the spring, said tongue being provided with a centrally disposed transverse depression 32 which provides two seats or recesses for the headed end 24 of the closure shank. When the head of the shank is in the first or end seat or recess 33, the flanged head 23 of the closure covers the oil opening 20. When the headed shank end 24 is in the second seat or recess 34, however, the closure shank is at the other end of the elongated casing slot 22 and the oil opening is exposed, this being the position of the parts in Fig. 6. If desired, the spring may be provided with a longitudinally disposed slot 35 to increase its resiliency, as will be readily understood.

This spring member 30 not only ensures the maintenance of the closure in proper position, so that there is no liability of the closure accidentally moving over and exposing the oil opening, but the closure is pressed outwardly so that there is but slight, if any, friction between the flanged closure head 23 and the outer surface of the casing wall. The outer surface of said casing wall is not, therefore, marred by sliding movement of the closure. As a further precaution, the flanged closure head 23 may be provided with an inner marginal recess 23ª so that only the central portion of the closure head 23 engages the casing wall, and this area is at all times covered by the closure head. Marring of the exposed casing wall surface is, therefore, effectively avoided.

While the spring member 30 may be secured to the casing wall by any suitable means, in the present illustration the split ring end portion 30ª surrounds the cam member 36 which forms part of the brake control means, as will be more fully understood from the co-pending application above referred to. The cam member 36 is secured in assembly by means of the screw 37 which is threaded into the manipulating button 38. A spring washer 39 is provided between the button 38 and the wall of the outside wall of the gear casing 4. As clearly shown in Fig. 8, the cam member 36 overhangs the ring portion 30ª; in other words the cam member has a reduced neck or shank portion for the ring portion 30ª.

What I claim is:

1. A fishing reel, comprising end heads, a spool rotatable between the same, a reversely threaded shaft, a line guide carriage, and a pawl removably mounted in said carriage and movable back and forth in the threads of said shaft, said pawl being provided with eccentrically located means for facilitating the manipulation of said pawl when inserting it into and removing it from said carriage.

2. A fishing reel, comprising end heads, a spool rotatable between the same, a reversely threaded shaft, a line guide carriage, and a pawl removably mounted in said carriage and movable back and forth in the threads of the said shaft, said pawl being provided with a tool receiving aperture to facilitate the manipulation of said pawl when inserting it into and removing it from said carriage.

3. A fishing reel, comprising end heads, a spool rotatable between the same, a reversely threaded shaft, a line guide carriage, and a pawl removably mounted in said carriage and movable back and forth in the threads of said shaft, said pawl being provided with an eccentrically located tool receiving aperture for facilitating the manipulation of said pawl when inserting it into and removing it from said carriage.

In testimony whereof I hereby affix my signature.

CHARLES T. PFLUEGER.